United States Patent [19]

Rasmussen et al.

[11] Patent Number: 4,754,476
[45] Date of Patent: Jun. 28, 1988

[54] PREMISES PAGE/INTERCOM SYSTEM UTILIZING TELEPHONE SET COMPONENT

[76] Inventors: Harry R. Rasmussen, 2215 Jovita Blvd., NE., Puyallup, Wash. 98371; Dan M. Percival, 21620 210 Ave., SE., Maple Valley, Wash. 98038; Charles Nickerson, 14338 Sandy Hook Rd., NE., Poulsbo, Wash. 98370

[21] Appl. No.: 21,608

[22] Filed: Mar. 2, 1987

Related U.S. Application Data

[63] Continuation of Ser. No. 714,182, Mar. 19, 1985, abandoned.

[51] Int. Cl.⁴ .............................................. H04M 3/42
[52] U.S. Cl. .................................... 379/159; 379/164; 379/160
[58] Field of Search ............... 379/159, 160, 156, 165, 379/166, 161, 164

[56] References Cited

U.S. PATENT DOCUMENTS

| | | | |
|---|---|---|---|
| 4,132,860 | 1/1979 | Rasmussen | 179/99 |
| 4,228,324 | 10/1980 | Rasmussen et al. | 179/99 |
| 4,323,734 | 4/1982 | Kimzey | 179/18 |
| 4,511,767 | 4/1985 | Wetzel et al. | 179/99 P X |

Primary Examiner—James L. Dwyer
Attorney, Agent, or Firm—Delbert J. Barnard

[57] ABSTRACT

A premises in which a plurality of telephone sets (10, 12) are used is provided with dedicated intercom wiring (1, 6) having its own power source. Each telephone set (10, 12) includes standard telephone circuitry (20), for communicating off premises, and also includes an intercom circuit (21). A switch (22) is provided for switching the receiver and transmitter (HS) of each set (10, 12) between off premises communications and intercom use. Each set (10, 12) includes a paging speaker (LS1) that is a part of the intercom system. To page, a button (96) is depressed at one station and the user talks into the transmitter at that station. The transmitted message is broadcasted through the speaker (LS1) at each telephone set in the system except the one that is sending the message. The intercom system control utilizes the same wire over which the audio signal is transmitted. The paging circuitry is off when the system voltage is at a particular level and is turned on by changing the system voltage to a different level.

8 Claims, 5 Drawing Sheets

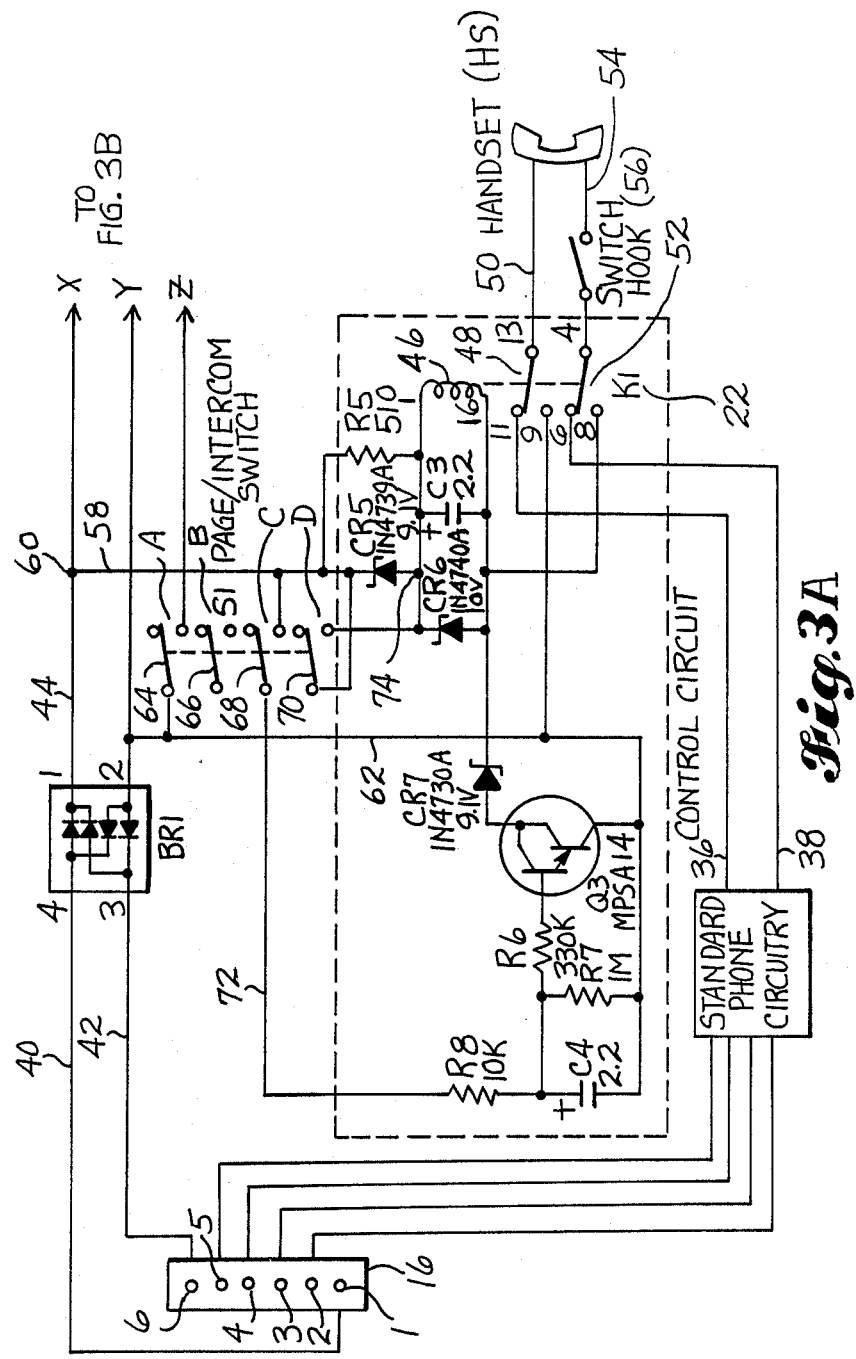

PREMISES PAGE/INTERCOM SYSTEM UTILIZING TELEPHONE SET COMPONENT

This is a continuation of application Ser. No. 714,182, filed May 19, 1985 and now abandoned.

DESCRIPTION

1. Technical Field

This invention relates to telephone equipment. More particularly, it relates to the provision of telephone station equipment which includes dedicated, on premises intercom wiring and control circuitry within the telephone sets on the premises for connecting the sets together for paging and intercom use.

2. Background Art

It is common to have a plurality of telephone stations connected together on a single premises in such a way that the telephones can be used for communications between the stations (i.e. intercom use). However, known systems with an intercom capability utilize the central office lines and equipment. Others use separate intercom lines, but typically with coded control and a separate power source for each telephone set.

U.S. Pat. No. 4,132,860, granted Jan. 2, 1979, to Harry R. Rasmussen, relates to a simplification of telephone system control circuitry involving building into the telephone sets some rather simple hold control circuitry which permit the elimination of a substantial amount of control unit circuitry and auxiliary wiring that had been used in prior multiple telephone set systems.

The principal object of the present invention is to further simplify multiple telephone set systems by providing for audio communications between stations without the use of central office telephone wires and control circuitry.

DISCLOSURE OF THE INVENTION

In basic form, a telephone and intercom system of the present invention comprises at least two stations on a premises. Each station includes a telephone set comprising a receiver, a transmitter and means for connecting the receiver and transmitter to telephone wires leading out from the premises to a remote location, for normal telephone use. In accordance with the invention, each telephone set also includes an intercom circuit and switch means for switching the receiver and transmitter between telephone use and intercom use.

In accordance with the invention, dedicated intercom wiring is provided on the premises. This wiring interconnects the several stations on the premises and it includes a current source for powering the intercom circuit. When the control switch is switched to intercom use, the receiver and transmitter of a first station are connected by the dedicated intercom wiring to the receivers and transmitters of the other stations on the premises. The current in the dedicated intercom wiring powers the receivers and transmitters for communications between the stations.

BRIEF DESCRIPTION OF THE DRAWING

In the drawing, like reference numerals denote like parts throughout, and:

FIG. 3A is a first portion of a schematic diagram of the intercom circuit;

BEST MODE FOR CARRYING OUT THE INVENTION

Figure 1:
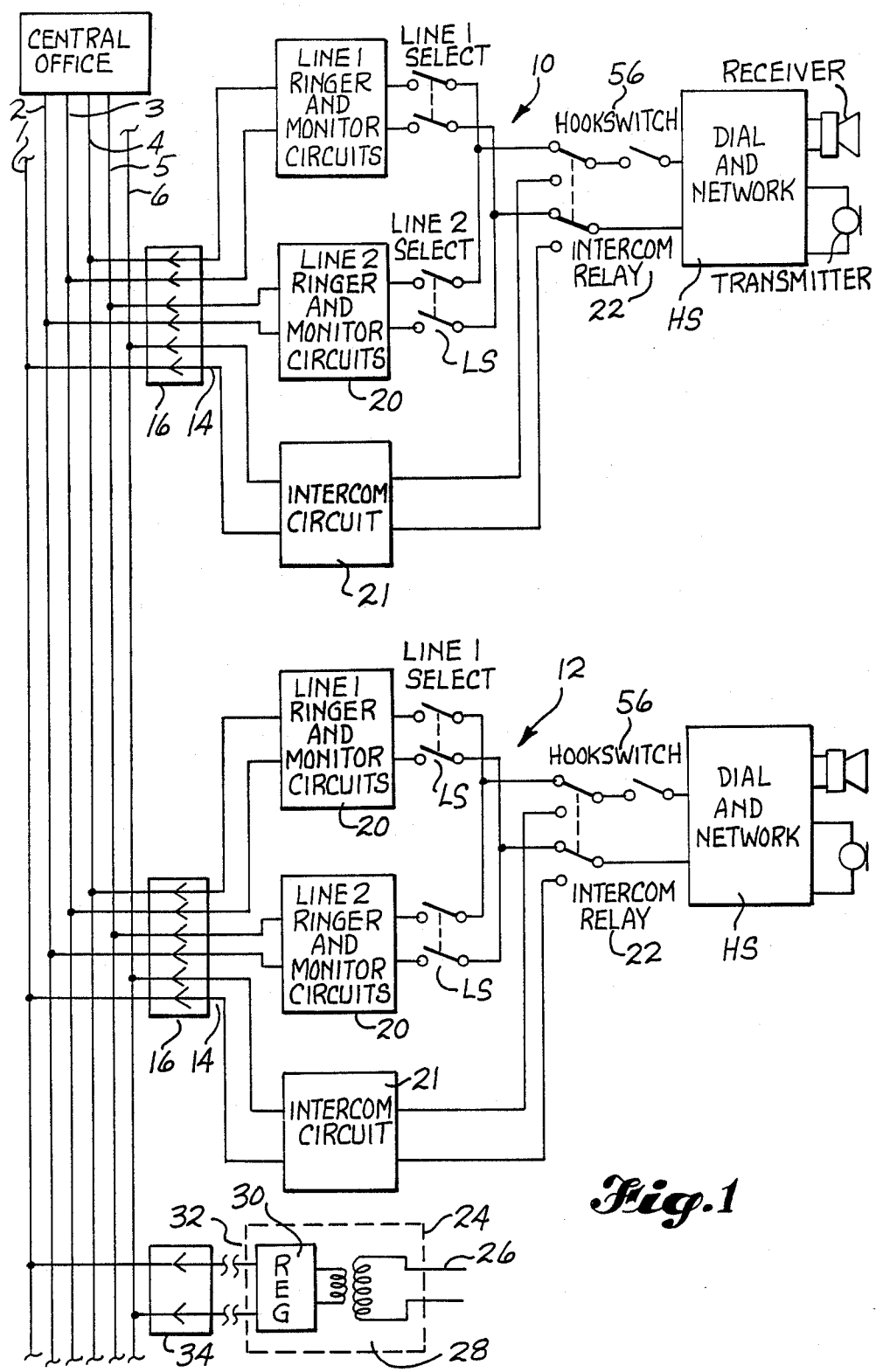
FIG. 1 is a generalized block diagram of an embodiment of the intercom circuit of the present invention, showing its incorporation into a telephone system, and showing the intercom off or inactive and the telephone system on or active.
Figure 2:
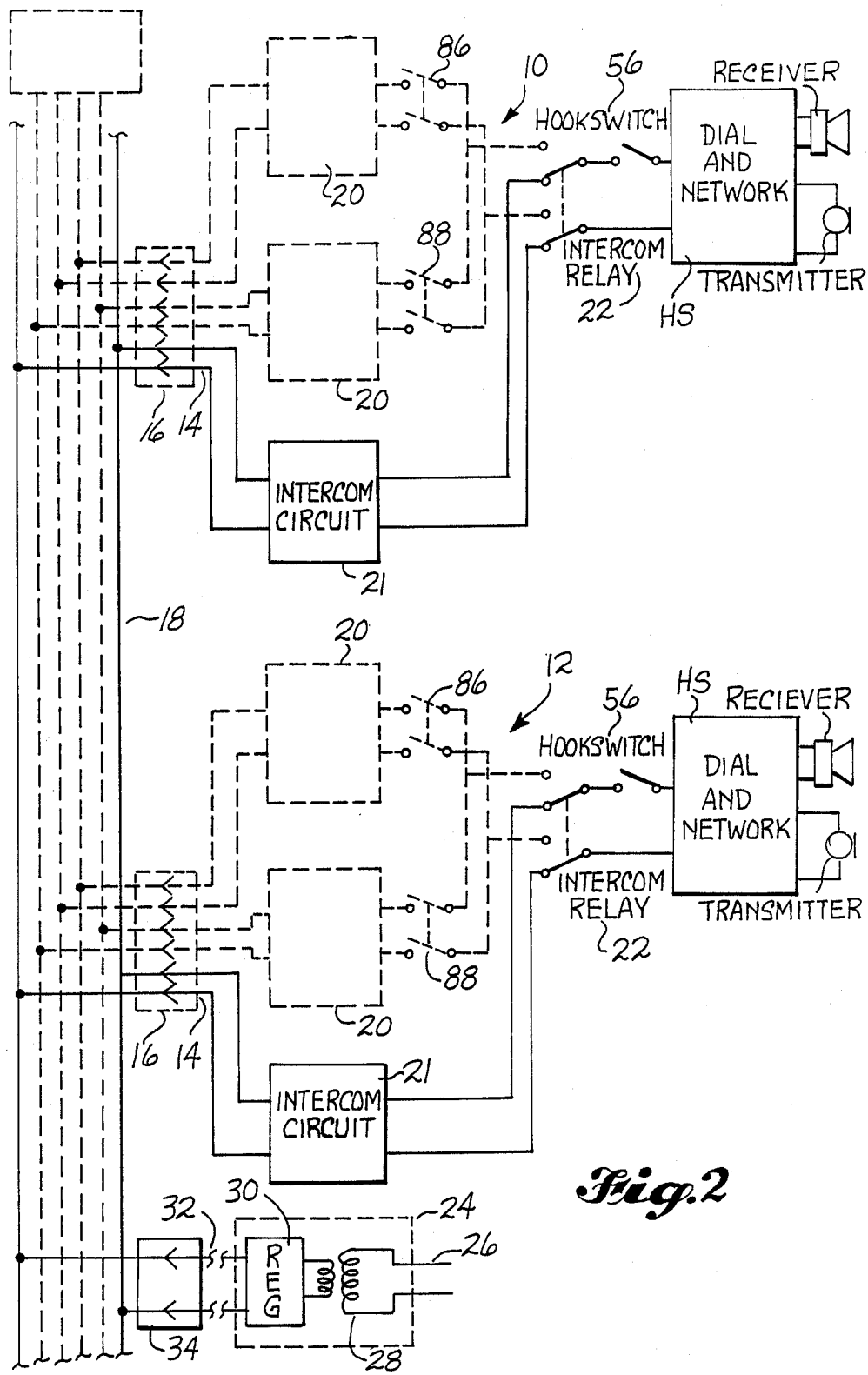
FIG. 2 is a view like FIG. 1, but showing in phantom line the telephone system components which are not in use when the intercom is on, and showing the intercom in an on position.

FIGS. 1 and 2 show an embodiment of the intercom circuit of the present invention incorporated into a two line telephone system. Of course, the number of telephone lines is a variable. The intercom circuit is usable in a telephone system which includes a single line, and is also usable in a telephone system which includes more than two lines.

By way of example, the intercom circuit of the present invention is shown in combination with a telephone system of the basic type disclosed by the aforementioned U.S. Pat. No. 4,132,860.

FIGS. 1 and 2 show two telephone sets or stations 10, 12, each connected by a six wire modular cord 14 and a modular wall jack 16 to a wiring set 18. Wire pairs 2, 5 and 3, 4 of the wiring set 18 are standard telephone conductor lines which carry central office supervisory signals and telephone voice signals between a central office and a customer's telephone set, installed at his residence or place of business. Wires 1 and 6 are dedicated parts of the intercom circuit of the present invention.

Embodiments of the ringer and monitor circuits 20 are described in U.S. Pat. No. 4,132,860.

One aspect of the present invention is the provision of an intercom relay 22 which is operable for switching between standard telephone circuitry and the intercom circuit. In FIG. 1 the relay 22 is shown in a position in which it connects the standard telephone circuitry with the handset assembly HS. FIG. 2 shows the intercom relay switched over into its second position, in which the handset assembly HS is disconnected from the ringer and monitor circuit and is connected to the intercom circuit. In FIG. 2 the portions of the total system which are not in use during use of the intercom circuit are shown in phantom lines. This view clearly shows that while the intercom circuit 21 of the present invention is incorporated into the telephone sytem, it operates in a separate loop from the components of the telephone system which are connected to the central office. The intercom wires 1, 6 exist solely within the premises that is served by the intercom system.

FIGS. 1 and 2 include a schematic showing of a power supply for the intercom circuit 21. It includes a power supply unit 24 having plugs 26 by which it is plugged into a 117 volt AC outlet (not shown). The power supply unit 24 includes a transformer 28 which reduces the 117 volts AC down to 36 volts AC and a regulator 30 which converts the current from AC to DC. Power supply unit 24 is coupled to wires 1 and 6 of the wire set 18 by a modular cord 32 and a wire jack 34.

Figure 3B:
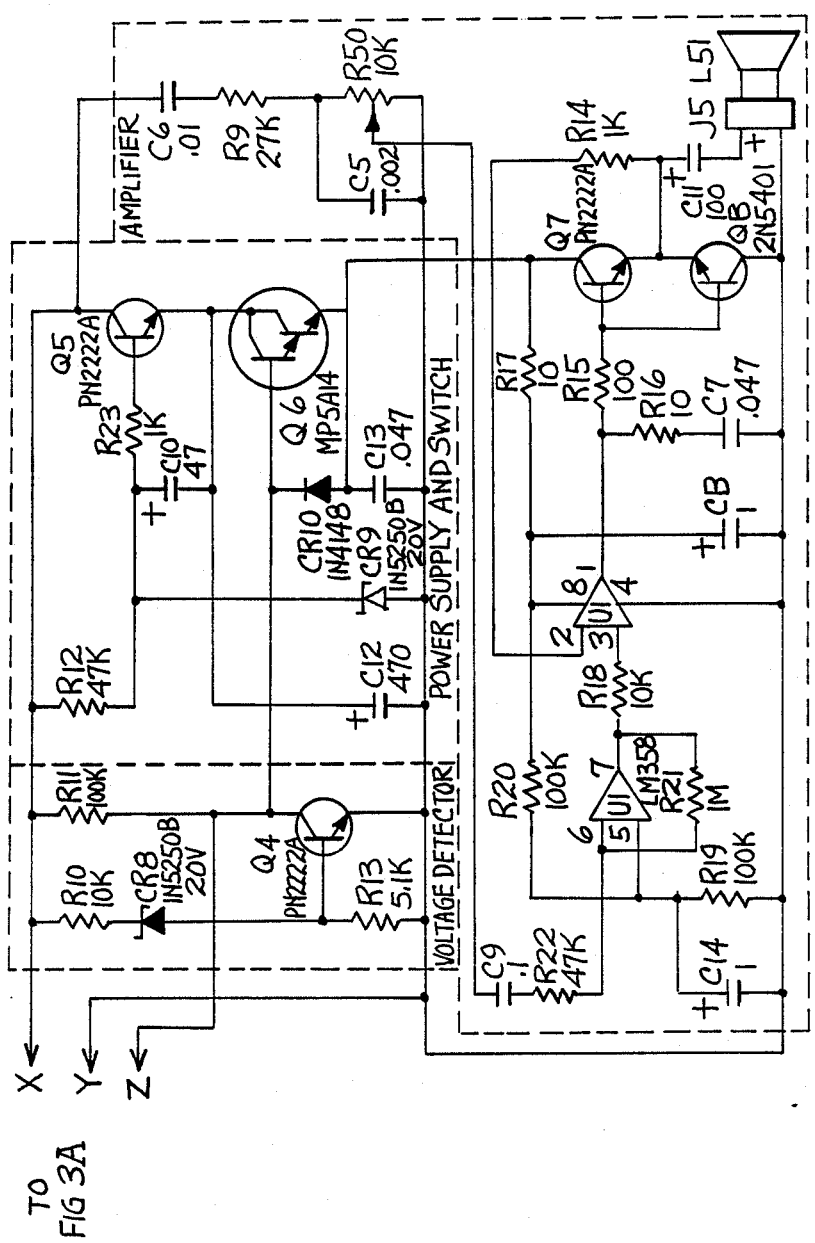
FIG. 3B is the remaining portion of the schematic diagram of the intercom circuit.

The schematic diagram of the intercom circuit 21 will now be described. This diagram has been divided into two parts, designated FIGS. 3A and 3B, because the diagram is too large to put on a single sheet.

In FIG. 3A, the box labeled "standard phone circuitry" represents the ringer and monitor circuits and the line select switches LS, i.e. the standard telephone circuitry located between the wall jack 16 and some wires 36, 38 leading to the relay 22.

Starting at the wall jack 16, wire 40 connects pin number 1 of jack 16 to pin number 4 of diode bridge BR1. Wire 42 connects pin 6 of wall jack 16 to pin 3 of diode bridge BR1. Diode bridge BR1 protects against polarity reversal. If the two lines 40, 42 are connected to the proper pins of the diode bridge BR1, the diode bridge BR1 has no function. However, if the pin connection is reversed, the diode bridge BR1 corrects the polarity so that the input voltage is properly at pin 1 and the circuit ground is properly connected to pin 2. Diode bridge BR1 draws approximately 1.5 volts.

In FIG. 3A the intercom relay K1 is shown in its "off" position. This is the position which it occupies when the coil portion 46 of the relay K1 is not energized. When the relay K1 is "off", switch element 48 connects wire 36 to wire 50 and switch element 52 connects wire 38 with wire 54. Wire 50 includes a hook switch 56 which is open when the handset HS is on the hook and is closed when the handset HS is off of the hook.

A conductor 58 extends from a junction 60 with conductor 44 to pin 8 of the relay K1. When relay K1 is energized, current flows from pin 8 to pin 4 and into wire 54 and then to and through the handset HS. It then flows from the handset HS through the hook switch 56 (when closed), through wire 50, to pin 13 and from pin 13 to pin 9, and from pin 9 to a ground wire 62.

Conductor 58 includes a first zener diode CR5 which drops the voltage 9.1 volts and a second zener diode CR6 which drops the voltage and additional 10 volts. The voltage drop across the handset is nominally 6 volts. BR1 causes a voltage drop of 1.5 volts. Thus the total voltage drop during intercom use is about 26.6 volts.

The voltage detector, power supply and amplifier portions of the intercom circuit are part of a paging system which is normally used to initiate use of the intercom system.

Intercom use including the handsets HS will now be described. This description will be followed by a description of the paging portion of the circuit.

Switch S1 appears in the form of a button which may be positioned closely adjacent the dial buttons on the telephone set. The particular switch S1 that is illustrated is a standard four contact switch. In the system of this invention, the contact regions A, C, and D are operable. Contact region B is not used.

When the control button is depressed, the switch elements 64, 66, 68, 70 are moved from open to closed positions. The closing of switch region C connects conductor path 58 with a conductor path 70 leading to a capacitor C4 and the base of a transistor Q3. Resistor R8 in conductor 70 is provided to limit the current. The current from resistor R8 charges capacitor C4 and also flows through resistor R6 to the base of Q3. Resistor R7 bleeds the capacitor C4 to zero bolts. R6 also limits the current and functions with C4 to provide an about four second time delay. This allows a user to depress switch S1 before picking up the handset HS. The user uses a finger to push the intercom button down only momentarily and then removes his finger from the button. This means that the switch S1 is only momentarily closed. Movement of switch element 68 to close the circuit at region C causes the capacitor C4 to be immediately charged to about 20 volts. If resistor R6 was not in the circuit, capacitor C4 would immediately discharge through the base of Q3. Resistor R6 delays this transmission for about four seconds, meaning that the user has about four seconds to pick up the handset after momentarily closing the switch S1.

Transistor Q3 is normally off. Current flow to the base of Q3 turns Q3 on. When Q3 is on this allows current flow from conductor 58 through CR5 then through CR6, then through CR7, and then through transistor Q3 to pin 9 of the intercom relay K1. This current also goes through the coil 46 and this is what energizes the coil 46, causing it to move the switch elements 48, 50 from their normal telephone use mode into the intercom mode. Resistor R5 sets a maximum impedance across CR5 and capacitor C3 provides low AC impedance across the coil.

When the user picks up his handset HS, this causes the hook switch 56 to close. When hook switch 56 is closed, the current flows from contact 8 of relay K1, through switch element 52, to contact 4, through wire 54, through the handset HS, through the hook switch 56, through wire 50 to contact 13, then through closed switch element 48 to contact 9, to the ground wire 62. Switch element 68 of switch S1 is open and current is no longer flowing to the base of transistor Q3 and transistor Q3 is no longer on. However, the closing of the hook switch 56 permits the current flow to continue and keeps the coil 46 energized until the handset HS is placed back on its hook, opening the hook switch 56.

During use of the intercom, the only part of the actual telephone equipment that is being used is the receiver and transmitter equipment in the handsets HS at the stations which are involved in an intercom conversation. The handsets HS, the wiring leading from the handsets to the relays K1, the wiring leading from the relays K1 to the wires 1, 6 of wire set 18 and the power supply elements 24, 26, 28, 30, 32, 34 all together constitute the workings of the intercom sytem. During intercom use, the receiver and transmitter equipment within the handsets HS are being powered by the current in wires 1 and 6, and not by any part of the standard telephone circuitry.

As earlier mentioned, the use of the intercom is usually initiated by a use of the paging function. A paging function is initiated by a user at a station depressing the control button for switch S1 and holding it in a depressed position. He does this while he is holding the handset HS in his other hand. He then speaks into the transmitter of the handset and as long as he keeps the switch S1 closed, what he says is heard at each of the other stations. It is broadcasted by a paging speaker LS at each of the other stations.

The closing of switch element 64 in region A of switch S1 shorts out the speaker LS of the sending set.

The closing of switch element 70 in region D of switch S1 allows current to flow from conductor 58 through switch region D to junction 74. This allows current to flow around CR5, reducing the system voltage on the intercom by the value of the voltage drop caused by CR5. This is about 9.1 volts. This reduction in voltage is seen at all of the stations.

When switch S1 is held closed to energize the paging system, the 26.6 system voltage is reduced by the 9.1 volts, producing a new system voltage of about 17.5 volts. When this 17.5 volts enters a receiving station it is reduced another 1.5 volts by the BR1 to a value of about 16.0 volts at voltage detector junction 76.

When switch S1 is open, prior to being depressed to activate the paging system, the system voltage at junction 76 is about 25.1 volts. This 25.1 volts is enough to cause current to flow through resistor R10 and zener diode CR8 to the base of transistor Q4. Thus, when switch S1 is open, current flows to the base of transistor Q4 and the transistor Q4 is on.

Resistor R10 limits the current. CR8 sets the voltage threshold. Zener diode CR8 has a 20 volt threshold meaning that no current will flow if the voltage is under 20 volts. Resistor R13 provides noises immunity for Q4.

When transistor Q4 is on, current flows from resistor R11 through transistor Q4 to conductor 78 leading back to ground. When switch S1 is open, there is current flow through resistors R12 and R23 to the base of transistor Q5, turning transistor Q5 on. Current flows through transistor Q5 to a capacitor C12. This charges capacitor C12 to a 19 volt level. The presence of capacitor C12 produces an increased power supply for eventual delivery to the amplifier.

Capacitor C10 decouples the audio from the base of Q5. Zener diode CR9 sets the maximum charge voltage of capacitor C12.

When switch S1 is depressed, to activate the paging system, the voltage level at juncture 76 is reduced to 16.0 volts. This is below the 20 volt threshold of CR8. As a result, current flow to the base of transistor Q5 is stopped. Current flow from resistor R11 no longer flows through transistor Q4 to ground, but rather now flows to the base of transistor Q6, turning transistor Q6 on. With transistor Q6, the current from transistor Q5 flows through transistor Q6 to the amplifier portion of the circuitry.

CR10 is a protection diode for transistor Q6. It permits current flow through CR10, from right to left as pictured, rather than in the reverse direction through Q6. Capacitor C13 prevents oscillations of transistor Q6.

While switch S1 is depressed for paging, the audio is in the line. The AC audio will flow through capacitor C6 and resistor R9. This C6–R9 path forms a high pass filter. Capacitor C5 and resistor R50 together form a low pass filter. Resistor R50 is a variable resistor and it provides a volume control for the paging speaker LS1.

The audio flows through capacitor C9 and resistor R22 to the input in 6 of a first stage amplifier U1. Resistors R19 and R20 form the bias for amplifier U1. Capacitor C14 stabilizes the bias from the audio. A voltage gain of U1 is formed by resistors R22 and R21.

The output of the first stage amplifier flows through resistor R18 to the input pin 3 of the second stage amplifier U2. The second stage amplifier U2 is a current amplifier. The first stage amplifier U2 is a voltage amplifier.

The output of the second stage amplifier U2 flows through resistor R15 to the bases of transistors Q7 and Q8. Transistors Q7 and Q8 form a push-pull amplifier. On the positive side, transistor Q7 pushes current to the speaker. On the negative side, transistor Q8 pulls current away from it.

Resistor R14 forms a feedback path for the second stage amplifier U2. Capacitor C11 blocks the DC component from flowing through the speaker LS1. Resistor R16 and capacitor C7 are decoupling so that the output of the second stage amplifier U1 does not oscillate. Resistor R17 and capacitor C8 provide power decoupling.

During the paging function, the sender of a message is talking in his handset HS. This message is then broadcast by the speakers LS1 at each of the other stations. If a person at one of the other stations wishes to send a message back, he must select switch S1 and pick up his handset HS with neither station having switch S1 depressed, the system voltage places the system in the intercom mode.

Figure 4:
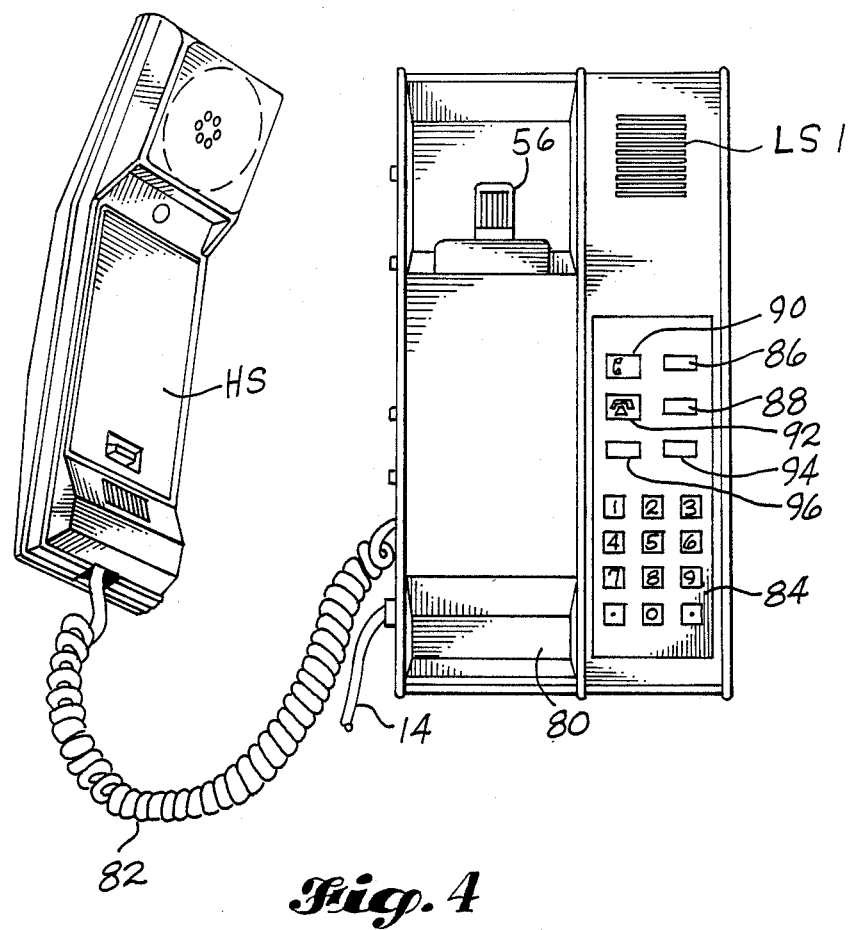
FIG. 4 is a view of a typical telephone set usable as a part of the invention at each station, such view showing the handset of the set lifted up from and spaced away from the base housing of the set.

FIG. 4 shows a telephone set of a type which may be used at each of the stations. It comprises a base housing 80, a handset HS, and an interconnecting cord 82. In this embodiment a button-set 84, for dialing, is incorporated into the housing 80. Line selection push buttons 86, 88 are located above the dial set 84. Line use displays 90, 92 are associated with the line select buttons 86, 88. Preferably, these displays are of the type disclosed in copending application Ser. No. 713,775, filed Mar. 19, 1985, now U.S. Pat. No. 4,653,094 by Harry R. Rasmussen, Charles Nickerson, Dan M. Percival and John D. Hoskinson, and entitled TELEPHONE SET LINE STATUS DISPLAY. A hold button 94 is provided, and an intercom page control button 96 is located adjacent hold button 94. It is button 96 which controls switch S1. In this embodiment, the speaker LS1 is located in an upper portion of the housing 80.

The various voltage values set forth in the above description are approximate values and are provided to show how the system is triggered by changes in system voltage. Further, it will be readily apparent to persons skilled in the art that numerous changes and modifications may be made to the disclosed embodiment without departing from the spirit of the invention.

What is claimed is:
1. A telephone and intercom system, comprising:
 at least two stations at a premises, each including a telephone set comprising:
 a receiver, a transmitter, means for connecting the receiver and transmitter to telephone wires leading out from the premises;
 an intercom circuit;
 mode switch means for switching the receiver and transmitter between telephone use and intercom use;
 dedicated intercom wiring on the premises interconnecting the stations, said intercom wiring including a current source for operating the intercom circuit, whereby when the mode switch means is switched to intercom use the receiver and transmitter at a first of the stations is connected by the dedicated intercom wiring to the receiver and transmitter at the other station and the current in said dedicated intercom wiring drives the receivers and transmitters of all sets for intercom communication,
 each said telephone set further including paging means including a speaker for paging use, and the intercom circuit of each set including means by which a user of that set can talk into the transmitter of the set and his message will be broadcast through the paging speaker means of the telephone set at the other station,
 the intercom circuit of each telephone set including control switch means operable for putting the system into a paging mode, said control switch means when so operated serving to change the system voltage of the intercom circuit, and each other telephone set including means responsive to the change in intercom circuit voltage for activating its paging means so that its paging speaker means will broadcast a message sent from another set; and wherein each paging means includes an amplifier, a power supply for such amplifer, including a switch which when on delivers power to the paging speaker and when off turns the paging speaker off, and a voltage detector means for turning the power on when the circuit voltage is at a first level and turning it off when the system voltage is at a second level, and wherein the means in each telephone set responsive to the change of intercom circuit voltage, for activating the paging means of such telephone set, comprises a transistor which is normally off and means responsive to the system voltage being below such threshold voltage for causing current flow to the transistor, for turning the transistor on, and said transistor, when on, serving to activate the paging means.

2. A system according to claim 1, wherein each telephone set includes circuit means for disabling the paging means for such set when such set is used for sending a paging message.

3. A telephone and intercom system, comprising:
at least two stations at a premises, each including a telephone set, and each telephone set comprising:
a receiver, a transmitter, means for connecting the receiver and transmitter to telephone wires leading out from the premises;
an intercom circuit; and
mode switch means for switching the receiver and transmitter between telephone use and intercom use;
said intercom circuit comprising dedicated intercom wiring on the premises interconnecting the stations, said intercom wiring including a current source for operating the intercom circuit, whereby when the mode switch means is switched to intercom use the receiver and transmitter at a first of the stations is connected by the dedicated intercom wiring to the receiver and transmitter at the other station and the current in said dedicated intercom wiring drives the receivers and transmitters of all sets for intercom communications, wherein said mode switch means includes a relay which normally connects the receiver and transmitter for telephone use and which includes a coil which when energized switches the receiver and transmitter into intercom use, and control circuit means including a select switch means and first circuit path means including a transistor and a capacitor, operable by a short duration closing of the select switch means for energizing the coil for a short duration of time, each said telephone set including a hook switch which is open when the telephone set is in an on-hook condition and is closed when the telphone is in an off-hook condition, and said control means also including a second circuit path means comprising wiring through the hand set, and said hook switch, which is operable by a closing of the hook switch, while the coil is energized for said short duration of time, for delivering system current to the coil for continuing energization of the coil so long as the telephone is in an off-hook condition.

4. A system according to claim 3, wherein said select switch means is also used for putting the system into a paging mode, by said select switch means being held into a closed position, and the control circuit includes means for changing the system voltage of the intercom circuit when the select switch means is held closed, and each other telephone set includes means responsive to the change in intercom circuit voltage for activating its paging means so that the speaker of such paging means will broadcast a message sent to it from another set.

5. A system according to claim 3, comprising a resistor in the first circuit path means between the capacitor and the transistor, for controlling the integral of time that it takes the capacitor to discharge through the transistor.

6. A system according to claim 3, wherein the transistor is normally off and includes a base and current flow from the capacitor to the base turns the transistor on.

7. A system according to claim 6, including a resistor between the capacitor and the base of the transistor for determining an interval of time for current from the capacitor to flow through the base of the transistor.

8. A system according to claim 7, wherein said mean responsive to the system voltage including a zener diode which has a voltage threshold which lies between the system voltage of the intercom circuit when it is in the intercom mode, and the system voltage of such circuit when it is in the paging mode.

* * * * *